Oct. 6, 1970
L. W. MARKS
3,532,963
COMPENSATING MEANS FOR UNBALANCE IN CASCADE TYPE
INSTRUMENT POTENTIAL TRANSFORMERS
Filed Feb. 7, 1968
2 Sheets-Sheet 1
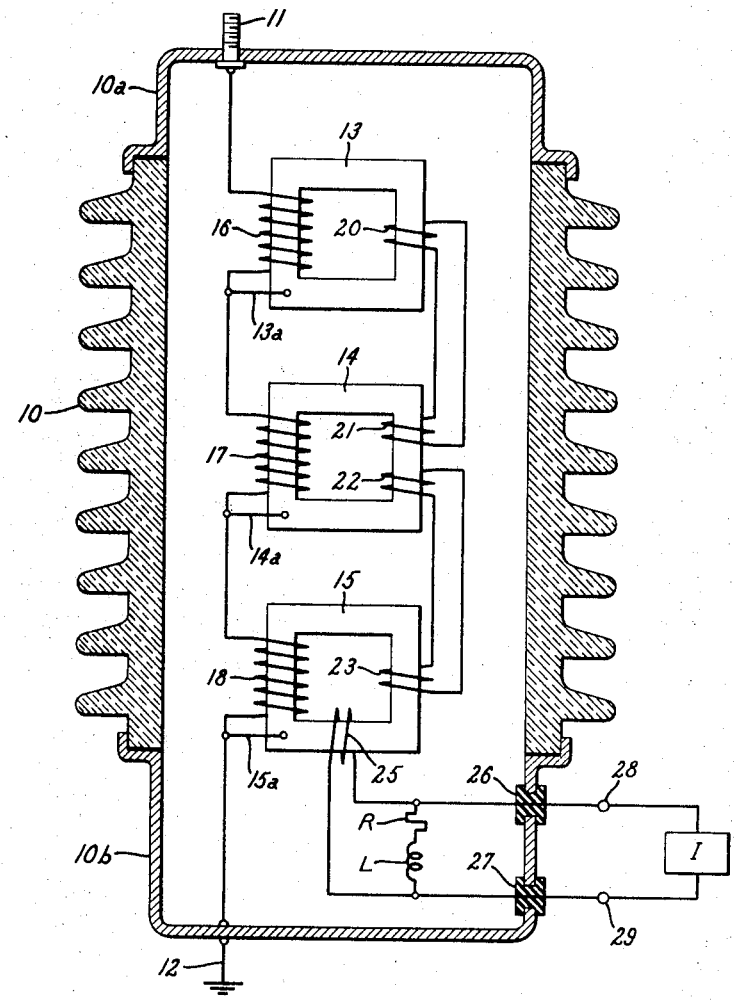
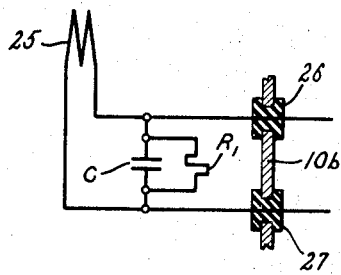
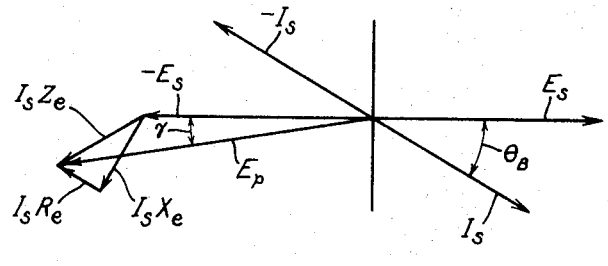
INVENTOR:
LOUIS W. MARKS,
BY
ATTORNEY

INVENTOR:
LOUIS W. MARKS,
BY
ATTORNEY

United States Patent Office 3,532,963
Patented Oct. 6, 1970

3,532,963
COMPENSATING MEANS FOR UNBALANCE IN CASCADE TYPE INSTRUMENT POTENTIAL TRANSFORMERS
Louis W. Marks, Pittsfield, Mass., assignor to General Electric Company, a corporation of New York
Filed Feb. 7, 1968, Ser. No. 703,608
Int. Cl. G01r 35/04; G05f 3/00
U.S. Cl. 323—48                    4 Claims

ABSTRACT OF THE DISCLOSURE

In high voltage potential transformers of the cascade type, unbalance in magnetic or electrical characteristics between the several stages results in voltage ratio and phase angle errors which in practice cannot readily be corrected except by rebuilding of one or more stages including replacement of cores. To avoid such expense and the uncertainty of stage replacement, the present invention provides means for compensating the error due to unbalance by connection of a fixed internal impedance across a secondary winding inductively coupled with one stage, preferably the output stage.

---

My invention relates to instrument type potential transformers for supplying to an indicating or recording instrument a low secondary voltage proportional in magnitude and phase to an applied primary voltage to be measured while insulating the instrument from the primary potential. More particularly the invention relates to multistage or cascade type potential transformers and to means for compensating the output voltage of such transformers for error due to magnetic or electrical unbalance between the several stages.

It is well known that the exciting current of any transformer, or the vectorial sum of exciting current and load current, in traversing the impedance of the primary and secondary windings produces voltage drops which result in magnitude (i.e., ratio) and phase angle errors, both at no-load and under load, between the primary voltage and the secondary voltage reversed. The error in magnitude is called ratio error and is usually expressed as a factor by which the marked (i.e., desired) voltage ratio must be multiplied to obtain the true operating ratio (under any predetermined load condition). This factor is called Ratio Correction Factor or RCF. Thus:

$$RCF = \frac{\text{True Voltage Ratio}}{\text{Marked Voltage Ratio}}$$

The error or deviation in phase angle is of no significance if only voltage magnitude is to be measured. However, if the output voltage of a potential transformer is to be supplied to a wattmeter, the phase angle error must be taken into account. The angle error is generally referred to as $\gamma$ (gamma) and is the angle between the primary voltage and the secondary voltage reversed. It is regarded as positive when the reversed secondary voltage leads the primary voltage.

It is common to express the foregoing magnitude and phase angle errors in a single number called Transformer Correction Factor or TCF. The TCF is that number by which a wattmeter reading must be multiplied to correct the combined effect of RCF and $\gamma$, and it thus represents the product of RCF and a function of $\gamma$. In practice, however, TCF is closely approximated by the sum of RCF and a fractional part of $\gamma$ as:

$$TCF = \frac{\gamma}{2600} + RCF$$

A graphical representation of constant TCF in terms of RCF and $\gamma$ is thus a straight line having negative slope as $\gamma$ and RCF vary. By defining upper and lower limits of TCF the graphical result is a pair of parallel lines of equal slope forming a parallelogram known as the Accuracy Parallelogram, and by this means potential transformers are classified in respect to limits of accuracy.

A transformer designed to maintain accuracy within predetermined limits of TCF typically has a small no-load phase angle error ($\gamma$) and RCF near unity (i.e., magnitude error=0) within an Accuracy Parallelogram of predetermined limits. Accuracy of course depends upon the volt-ampere magnitude and power factor of the burden. In practice, standard burdens have been specified and transformers are designed to accommodate one or more such burdens within predetermined limits of voltage accuracy defined by a selected Accuracy Parallelogram. This is sometimes difficult to accomplish with multi-stage potential transformers because magnetic or electrical unbalance between stages additionally affects the voltage magnitude error, and thus the Ratio Correction Factor RCF, independently of load current. This effect produces ratio and phase angle errors in the final output stage of a cascade type transformer which are considerably greater than the same transformer would demonstrate if all stages were identical in magnetic and electrical characteristics.

In cascaded potential transformers several cores, each provided with at least one primary winding, are arranged with the primary windings connected in series circuit relation across a high potential source and the cores electrically connected to intermediate potential points between the high potential and ground. As is well known to those skilled in the art, coupling windings are provided between the cores of adjacent stages in order to minimize the inductance of the primary windings. A low voltage secondary output winding is provided only on the core of the last low voltage stage but if desired, may be provided on the top stage. With such a cascade arrangement of several cores having their primary windings connected in series, it is well known that slight variations in the magnetic reluctance and, or core losses of the several cores will cause appreciable inequality in the voltage drops across the several primary windings. Similarly, unequal stray capacitance between each stage and ground will cause voltage unbalance in the series primary circuit. Thus the primary winding of the final low voltage stage may receive more or less than its proportionate share of the total voltage drop. In such cases the voltage induced in the output winding of this last stage will be correspondingly higher or lower than its turns ratio relationship to the primary circuit even when corrected for load current. Thus primary unbalance in the voltage drops between stages of cascaded potential transformers has an effect upon the output stage similar to the addition or subtraction of turns from the output winding, and this error effect is superposed, both at no-load and under-load, upon the voltage errors resulting solely from current flow in the windings. In addition, some deviation in phase angle will result from the unbalance.

Accordingly, therefore, it is a general object of my invention to improve the accuracy of multi-stage or cascade type instrument potential transformers.

It is a more particular object of my invention to provide compensating means for counteracting the effects of primary circuit unbalance in cascade type potential transformers.

More specifically it is an object of my invention to provide compensating means for counteracting voltage ratio error and phase angle error in the final stage of a cascade type potential transformer resulting from magnetic or electrical unbalance between stages.

In carrying out my invention in one preferred embodiment I utilize a plurality of closed magnetic cores of low magnetic reluctance each of which is provided with at least one primary winding and at least one compensating winding. The primary windings are connected in series circuit relation across a source of high potential the magnitude of which is to be measured, and the low voltage stage is provided with a low voltage secondary or output winding. Voltage ratio error and phase angle error in the output stage resulting from magnetic or electrical unbalance in the cascaded series of transformer stages is compensated by means of a reactive impedance connected as a fixed load across all or part of the secondary winding. The reactive compensating impedance may be either inductive or capacitive, as required, and is selected in magnitude in accordance with the magnitude of the voltage ratio error and phase angle error at no load.

The effect of such fixedly connected compensating impedance is to modify both the voltage ratio and phase angle errors of the complete transformer by a fixed amount, both at no load and under full load in such a direction that overall accuracy as measured by TCF is improved throughout the operating range.

My invention will be more fully understood and its several objects and advantages further appreciated by referring now to the following detailed specification taken in conjunction with the accompanying drawings wherein:

FIG. 1 is a schematic circuit diagram of an instrument type cascade potential transformer embodying my invention;

FIG. 2 is a partial schematic circuit diagram of the transformer shown at FIG. 1 modified to illustrate another embodiment of my invention;

FIG. 4 is a simplified partial vector diagram similar to that of FIG 3 illustrating particularly the relationship between primary and secondary voltages;

Figure 5:
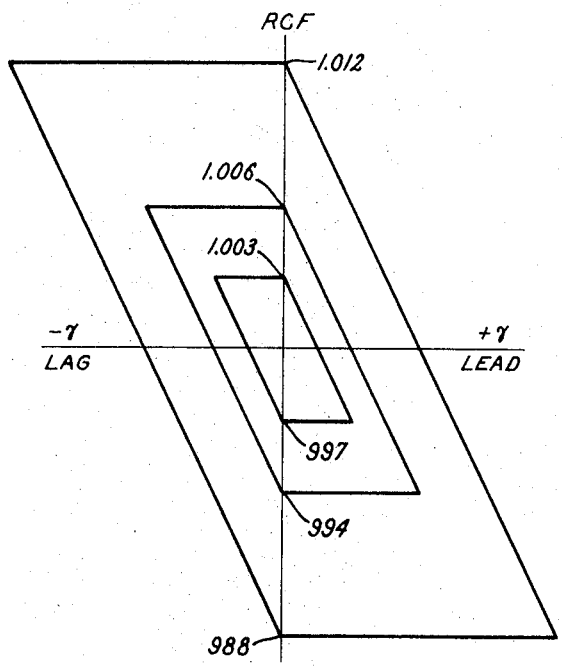
Figure 6:
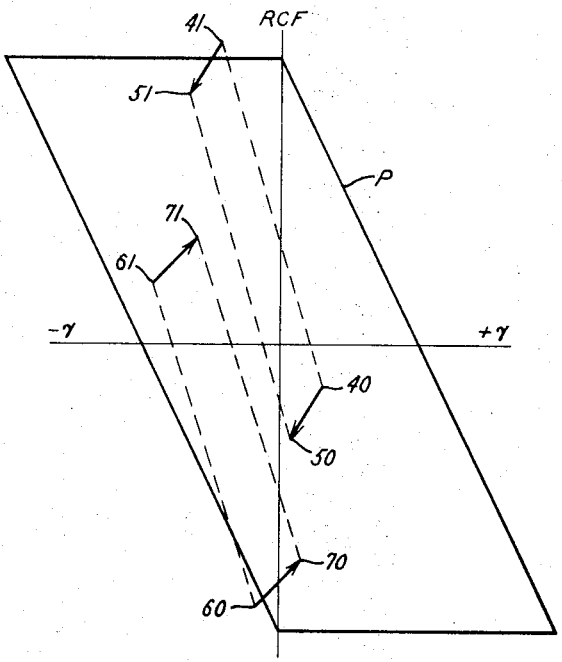

FIG. 5 is a graphical representation of typical Accuracy Parallelograms defining limits of secondary voltage acccuracy in a transformer of the type illustrated at FIG. 1; and FIG. 6 is a diagrammatic representation of a single Accuracy Parallelogram upon which are superposed typical accuracy characteristics of several illustrative potential transformers of the cascade type under load and no-load conditions to illustrate the effect of error compensation in accordance with my invention.

Referring now to FIG. 1, I have illustrated a cascade type potential transformer mounted in an enclosure 10 of insulating material having high voltage and low voltage metallic end caps 10a and 10b, respectively. The high voltage end cap 10a is provided with a high voltage line terminal 11, and the low voltage end cap is connected to ground potential as at 12, the terminal 11 and ground thus constituting high voltage input terminals for the transformer.

Within the enclosure 10 there is mounted a multistage potential transformer comprising three closed-loop magnetizable cores of the low reluctance type identified as 13, 14 and 15. The cores are provided, respectively, with primary windings 16, 17 and 18 connected in series circuit relation between the high potential terminal 11 and ground. The cores 13, 14 and 15 are maintained at intermediate potentials by connection of each core to one end of its associated primary winding, as by connections 13a, 14a and 15a. In a manner well known to those skilled in the art, adjacent cores are inductively interconnected by means of coupling windings, the cores 13 and 14 being coupled by loop circuit connection of their respective windings 20, 21, and the cores 14 and 15 being coupled by loop circuit connection of their respective windings 22, 23. It will be observed that the high voltage and low voltage stages are each provided with a single coupling winding, and the intermediate stage represented by the core 14 is provided with two coupling windings 21 and 22.

The final or low voltage stage of the transformer shown at FIG. 1 is provided with an output or secondary winding 25 wound upon the core 15. The output winding is connected through bushings 26, 27 to output terminals 28 and 29. The transformer output terminals 28 and 29 are shown connected to supply current to a suitable measuring instrument I which serves as an electrical load on the transformer output winding 25.

Between the secondary winding output terminals 28 and 29 of the transformer shown at FIG. 1, there is provided in shunt circuit relation with the secondary winding 25 a primarily reactive compensating impedance. At FIG. 1 such compensating is shown as in inductance L having a small resistor R in series therewith to represent resistive loss in the inductance. In some cases, of course, a separate resistor R may be added to provide the desired total impedance. The compensating impedance R, L is preferably positioned within the transformer housing 10 and fixedly connected between the output terminals 28, 29. It is thus permanently in parallel circuit relation with any external load connected across the terminals 28, 29 as indicated schematically by the instrument I. The load I may, for example, be a suitable voltage indicating instrument or the voltage measuring coil of a wattmeter.

At FIG. 2 I have shown the secondary circuit only of a transformer similar to that of FIG. 1 in which the internal compensating burden is capacitive rather than inductive. Specifically a capacitor C is connected across the winding 25 in parallel with a resistor $R_1$. It will be understood that $R_1$ may be a discrete resistor to provide a desired power factor or it may merely represent the resistance inherent in the capacitor C.

As is well understood by those skilled in the art, a potential transformer serves both to insulate the secondary circuit and output terminals from the potential of the primary circuit and also to provide a secondary output voltage proportional in magnitude and phase to that of the primary voltage. In most potential transformers, and particularly in cascade type potential transformers, the primary voltage is higher than secondary voltage. In the case of cascade transformers the primary voltage is usually of the order of thousands or hundreds of thousands of volts, while the secondary output voltage is of the order of one hundred volts. The theoretical voltage ratio between the primary and secondary windings of a transformer having substantially zero leakage flux is equal to N1/N2 where N1 is the number of winding turns in the entire series connected primary circuit and N2 is the number of turns in the secondary winding (i.e., the output winding 25 of FIG. 1).

In the instrument potential transformers of the type described, there are a number of sources of error in the magnitude and phase of the output winding voltage. Errors in magnitude result in a ratio of primary to secondary voltage which is slightly less or slightly greater than the desired ratio as determined by the ratio of winding turns. Errors in phase result from displacement of the voltages from the ideal 180 degree phase displaced relation, usually expressed as a small angle of error γ (gamma) between the primary voltage and the secondary voltage reversed. One such source of error, for example, may be loss of stray flux by magnetic leakage. In a low reluctance iron core of the loop or closed type, such leakage is very small and for present purposes may be neglected. A second source of error in ratio and phase angle between primary and secondary voltages arises unavoidably from impedance drops in the several windings as the result of current flow therethrough.

These latter errors are proportional in magnitude to the amount of current flow and exist in all potential transformers both single stage and multistage. Finally, a source of voltage ratio and phase angle error characteristic of cascade type potential transformers arises from magnetic or electrical unbalance between the stages. To understand the nature of these several errors and the effect of my invention, it is desirable first to review briefly the nature of voltage errors characteristically present in potential transformers as a result of current flow.

Figure 3:
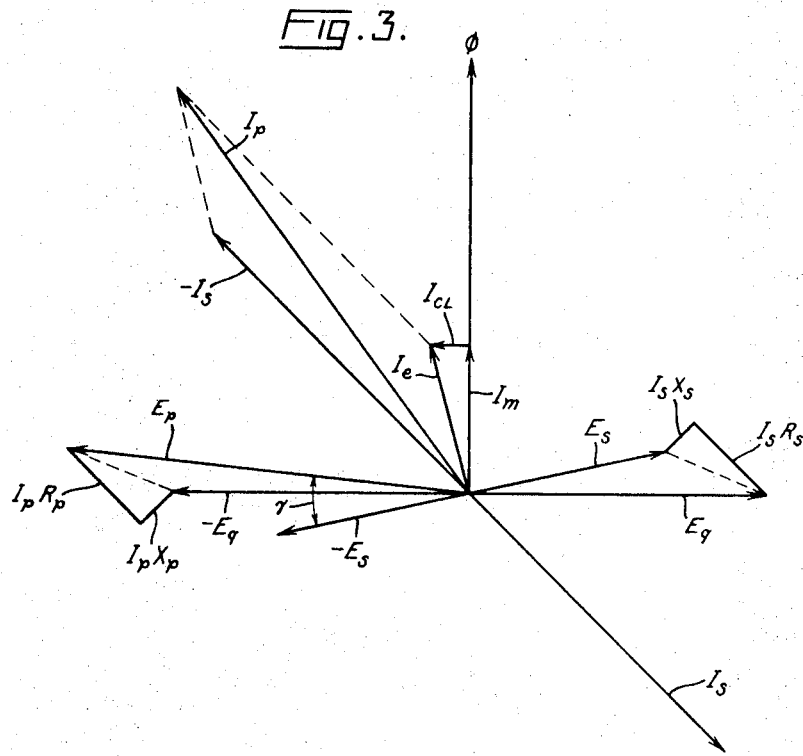
FIG. 3 is a diagrammatic vectorial representation of typical current and voltage vectors representing the characteristic relationship of such quantities in a potential transformer.

At FIG. 3, I have shown a vector diagram of primary and secondary voltage and current relations in a typical potential transformer having an ideal, or nominal, primary to secondary voltage ratio of unity. The manner in which voltage ratio error and voltage phase angle error arise as a result of current flow in the transformer will become evident from this diagram In the diagram at FIG. 3 the mutual core flux (common to both primary and secondary) is shown as a vector $\phi$ extending upward at 90 degrees to the base line. The exciting current $I_e$ leads the flux vector by an acute angle, and, as is well known, comprises a magnetizing component $I_m$ and a core loss component $I_{cl}$. The voltage induced in the secondary winding by the mutual flux $\phi$ is represented by the vector $E_q$ and the component of primary voltage required to overcome the induced voltage is shown as $-E_q$. The secondary current due to the burden is represented by $I_s$. The total primary current $I_p$ consists of the vector addition of exciting current $I_e$ and reversed secondary current $-I_s$. When $I_s$ is zero, the only current that flows is $I_e$ which produces an impedance drop in the primary winding and causes the reversed secondary voltage $-E_q$ (which under no load is equal to $E_s$) to differ slightly in magnitude and phase from the applied primary voltage $E_p$. This no load condition, while not shown on the diagram, is well understood by those skilled in the art.

In order better to illustrate the source of voltage magnitude and phase angle errors, however, there is shown at FIG. 3 a secondary current $I_s$ lagging the secondary voltage and representing an inductive burden. This secondary current $I_s$ together with the exciting current $I_e$ produce a primary current $I_p$. From an examination of FIG. 3 it will now be evident to those skilled in the art that as a result of the impedance drop in the secondary winding due to the flow of the load current $I_s$, the actual secondary voltage $E_s$ differs from the secondary induced voltage $E_q$ by a vectorial quantity representing voltage drop in the secondary winding. At FIG. 3 this quantity is the sum of the resistive and reactive voltage drops in the secondary winding, shown respectively as $I_sR_s$ and $I_sX_s$. Similarly the primary winding input voltage $E_p$ differs from the reversed induced secondary voltage $-E_q$ by the voltage drop components $I_pR_p$ and $I_pX_p$, the vectorial sum of which represent impedance drop in the primary winding. It will thus be evident that the actual secondary voltage $E_s$, shown reversed as $-E_s$, differs from the primary voltage $E_p$ both in magnitude and phase as a result of current flow. The voltage magnitude error is usually expressed as a number, or factor, by which the rated, or marked, voltage ratio must be multiplied to obtain the true, or actual, voltage ratio under a particular loan condition. The phase angle error is shown as an angle $\gamma$ between the primary voltage and the secondary voltage reversed, this error being considered positive when the reversed secondary voltage vector leads the primary voltage as shown at FIG. 3. It will be understood by those skilled in the art that FIG. 3 is illustrative of the principles involved and that for simplicity of illustration the angle $\gamma$ has been shown positive. In instrument transformers under high power factor load conditions RCF is usually greater than 1, and the angle $\gamma$ is usually negative. These relationships, however, depend upon the character of the load impedance, and under some conditions it is possible that the phase angle error $\gamma$ will be positive or the RCF less than 1, or both.

At FIG. 4 I have illustrated a similar vector diagram wherein exciting current is neglected and equivalent values of primary and secondary winding impedance are represented by $R_e$, $X_e$ and $Z_e$. The resultant equivalent impedance drop through the transformer is represented by the vector $I_sZ_e$ and is so proportioned vectorially that the angle $\gamma$ is negative. The vectorial difference between $I_sZ_e$ and the primary voltage $E_p$ represents $-E_s$, and thus FIG. 4 illustrates the voltage magnitude and phase angle errors in a manner similar to FIG. 3 but for errors due only to burden.

It will now be evident to those skilled in the art that the voltage magnitude and phase angle errors in a typical potential transformer having low magnetizing current are small at no-load and increase as load current increases. It is also well understood that the phase angle error, while slightly positive at no-load usually decreases to zero and becomes negative as load increases unless the load is highly inductive. Moreover if the load, i.e., burden, is primarily resistive (i.e. power factor of burden is substantially unity), the phase angle error increases negatively as load increases, while the voltage ratio error increases at a much lesser rate. By way of comparison it may also be noted that with highly reactive loads the ratio error changes much more significantly as load increases than does the phase angle error. These effects are well known to those skilled in the art and will become more evident by referring now to the Accuracy Parallelograms described below.

At FIG. 5 I have shown three Accuracy Parallelograms representing three degrees or classes of accuracy as established by the American Standards Association. Referring for example to the outer diagram, the upper and lower limits of Ratio Correction Factor RCF are established arbitrarily as 1.012 and .988, and accordingly this outer parallelogram is referred to as a 1.2 accuracy class diagram. The lateral limits of negative slope are established by the determination of upper and lower limiting values of the combined quantity TCF, i.e., Transformer Correction Factor, where $$TCF = \frac{\gamma}{2600} + RCF$$

The significance of this diagram is that any point within its confines represents an ecceptable value of TCF and its components RCF and $\gamma$. The smaller included parallelograms similarly represent 0.6 and 0.3 accuracy classes, respectively, wherein the limits of accuracy are smaller.

As previously indicated, cascade type potential transformers are characterized by still another source of error resulting from voltage unbalance, or inequality, between the several series connected primary windings. If, for example, one of the upper cores (see FIG. 1) has abnormally high magnetic reluctance and all others have a desired lower value, the voltage across the primary winding of the output stage will be greater than the desired proportional amount. Accordingly the output voltage of the secondary winding 25 will be higher than desired, and RCF for the entire assembly will be lower than it would have been in the absence of magnetic unbalance. Such low Ratio Correction Factor (RCF) is usually accompanied by a negative phase angle error $\gamma$ with the secondary circuit open. Conversely, if the core of the output stage is abnormally high in reluctance, RCF for the entire transformer is higher than it would be in the absence of unbalance, and the phase angle error $\gamma$ is usually positive at no load. Such conditions are illustrated at FIG. 6 in order to clarify and explain the mode of operation of my invention.

At FIG. 6, I have illustrated a single predetermined Accuracy Parallelogram defining a desired accuracy class and generally identified as P in combination with a graphical representation of certain transformer error characteristics which illustrate the error compensating effect of my invention.

In FIG. 6, I have illustrated a point 40 representing the values of RCF and $\gamma$ for a typical cascade type potential transformer of low reluctance such as shown at FIG. 1 but with the compensating impedance L omitted and the output terminals 28, 29 open-circuited. This point 40, then, represents no-load voltage error for an uncompensated potential transformer of the type to which my invention is applicable. It will be noted that the phase angle error $\gamma$ is positive. RCF at point 40, while less than unity (as a result of turns compensation designed into the device), is higher than expected and indicates high reluctance in the output stage.

As previously pointed out, the voltage ratio and phase angle errors of the potential transformer typically increase along a line of negative slope when an inductive load such as the burden I at FIG. 1 is connected to the output terminal. At FIG. 6 the line 40, 41 represents the locus of such ratio and phase angle errors for a .85 power factor inductive burden, the point 41 representing the error values at the highest standard burden established by the American Standards Association, i.e., 400 volt-amperes at 0.85 power factor and 120 secondary volts. It will be observed that at this full-load, point 41 Ratio Correction Ractor is beyond the acceptable limits of the Parallelogram P.

If now a capacitive burden such as that shown at C in FIG. 2 is connected across the secondary terminals 28, 29 in fixed parallel circuit relation with the secondary winding 25, the positon of the no-load error point 40 is shifted to a point 50. The locus of voltage errors from no-load to full-load then follows a line 50, 51 where 51 represents the voltage errors at full 400 volt-ampere burden. It will be noted that the point 51 is shifted in the same direction and by the same amount as the displacement between the points 40 and 50. This displacement brings the full load error values of the transformer back within the confines of the parallelogram P, indicating that the errors in phase angle and voltage magnitude and the consequent value of Transformer Correction Factor TCF are acceptable.

By way of further illustration, I have shown also at FIG. 6 the similar characteristics of a cascade type transformer having no-load error characteristics represented by a point 60 and corresponding full load error characteristics represented by a point 61. The no-load point 60 is beyond the confines of the Accuracy Parallelogram P with a small negative value of $\gamma$. This indicates lower than normal RCF, such as may result, for example, from high reluctance in one of the upper cores. To correct this conditions, I connect between the transformer output terminals 28 and 29 a primarily inductive internal burden L as shown at FIG. 1, the particular burden utilized in this case having a power factor of .065. The effect of the inductance L connected in parallel circuit relation with the transformer winding 25 is to shift the no-load error point from 60 to a point 70 well within the confines of the Accuracy Parallelogram P. It will now be clear to those skilled in the art that the locus of errors, between no-load and full-load of the transformer is so compensated is represented by a line 70, 71, the point 71 being displaced from the point 61 in the same direction and amount as the point 70 is shifted from the point 60.

It will now be observed by those skilled in the art that by selective use of either inductive or capacitive internal loading of a potential transformer secondary winding, I am able to displace the error characteristic of the transformer at all points between no-load and full-load in one or the other direction substantially perpendicular to the limiting lines of negative slope representing permissible values of TCF in the standard Accuracy Parallelogram for potential transformers. Thus it is evident that I have provided a simple and inexpensive means for error compensation particularly applicable to cascade type high voltage potential transformers. As previously described, magnetic or electrical unbalance between the several stages of such a transformer affects the error characteristic in a manner similar to undesired inaccuracy in turns ratio. Unbalance in one sense between the output stage and other stages results in an abnormally low secondary voltage and high RCF. Such inaccuracy may be compensated and the transformer errors brought within permissible limits by use of a capacitive impedance energized from a secondary winding portion of the transformer. Conversely voltage magnitude errors of an opposite sense caused by unbalance in an opposite sense between cores causes an abnormally high secondary voltage and a low RCF. Such transformers may be compensated by connecting fixedly across a secondary winding, or a part thereof, a primarily inductive impedance.

While I have shown and described certain preferred embodiments of my invention by way of illustration, other modifications will occur to those skilled in the art. For example, the impedance coupled secondary winding referred to above and in the appended claims need not be the transformer output winding as illustrated in drawing; it may be a separate winding on any desired core, or it may be an included or extended portion of a primary winding or of the secondary ouput winding. I therefore wish to have it understood that I intend herein to cover all such modifications as fall within the true spirit and scope of my invention.

What I claim as new and desire to secure by Letters Patent of the United States is:

1. In an instrument potential transformer of the cascade type,
    a plurality of substantially identical magnetizable cores each of which is subject to undesired deviation in its magnetic characteristics from desired values,
    a primary winding on each said core, said primary windings being substantially identical but subject to minor deviation in electrical characteristics from undesired values,
    means connecting said primary windings in series circuit relation between a pair of input terminals adapted for connection to a source of high potential to be measured, each said primary winding being electrically connected to its associated core thereby to maintain said cores at graded intermediate potentials;
    means inductively coupled to the core of lowest potential and including a pair of output terminals for providing an output voltage proportional to the voltage of said high potential source,
    the desired ratio of voltage magnitudes between said input and output terminals being subject to undesired error arising from inequality in the magnetic and electrical characteristics of said cores and primary windings,
    a reactive impedance, and means for energizing said reactive impedance including a winding inductively coupled to a least one said core, said reactive impedance compensating said undesired error in ratio of input and output voltage magnitudes.

2. An instrument transformer according to claim 1 wherein said energizing winding is inductively coupled with the magnetizable core of lowest potential.

3. An instrument transformer according to claim 1 wherein said output voltage means includes a secondary output winding connected between said output terminals and said reactive impedance comprises an inductance fixedly connected across at least a portion of said output winding.

4. An instrument transformer according to claim 1 wherein said output voltage means includes a secondary output winding connected between said output terminals and said reactive impedance comprises a capacitor fixedly connected across at least a portion of said output winding.

References Cited

UNITED STATES PATENTS

| | | | |
|---|---|---|---|
| 1,731,865 | 10/1929 | Pfiffner | 323—50 |
| 2,113,421 | 4/1938 | Camilli et al. | 323—44 |
| 1,994,279 | 3/1935 | Higgins | 323—61 X |
| 2,600,204 | 6/1952 | Carleton. | |
| 3,040,240 | 6/1962 | Gotal et al. | 323—50 |

J D MILLER, Primary Examiner

GERALD GOLDBERG, Assistant Examiner

U.S. Cl. X.R.

323—60, 109, 110; 324—74